Aug. 16, 1960   G. G. GALPIN   2,948,982
FISH LURES
Filed May 1, 1957
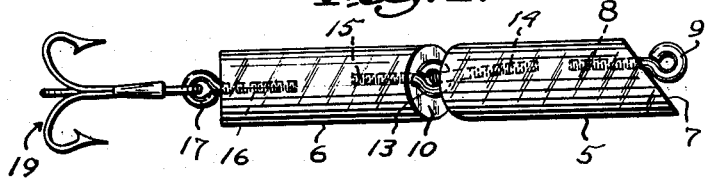
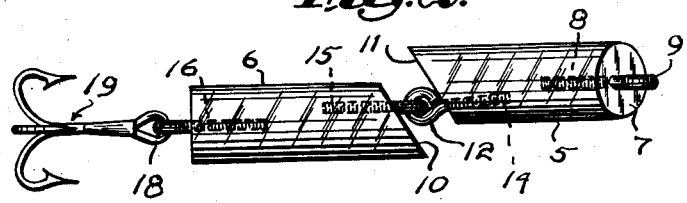
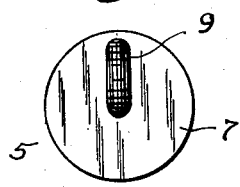
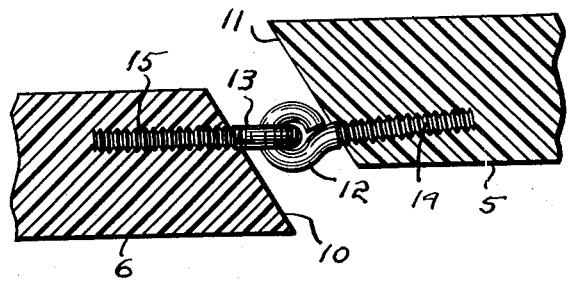
Inventor:
Gerald G. Galpin,
by Abbott Spear
Attorney

United States Patent Office 2,948,982
Patented Aug. 16, 1960

2,948,982
FISH LURES
Gerald G. Galpin, 144 Elm St., Montpelier, Vt.
Filed May 1, 1957, Ser. No. 656,442
5 Claims. (Cl. 43—42.15)

The present invention relates to fish lures of the type having body members pivotally connected in end-to-end relationship for relative swinging motion when drawn through the water.

The large number of anglers and the nature of their sport inevitably result in many proposals relating to lures of the generally indicated type. A number of these are effective to some extent, but they all fail to recognize that it is motion and the suggestion of shape and coloration of the minnow, for example, that induces game fish to strike. The general objective of this invention is to provide lures having such characteristics to an extent rendering them singularly effective in use.

This general objective is attained with lures having one or more of the following features in varying degrees; motion, translucence, and permanent color arranged and exposed to suggest a minnow and its important coloration. These features result by providing lures in which means pivotally join body members, preferably cylindrical and of clear plastic stock, in end-to-end but offset relationship and which preferably have not only the anchors of the connecting means but also those of the line attaching means and of the hooks extending a substantial distance into appropriate ones of the members to provide, with translucent body members, color and the suggestion of other physical features of the minnow or other swimming food source.

In the accompanying drawings, there is shown an illustrative embodiment of the invention from which these and other of the objectives, novel features, and advantages of the invention will be readily apparent.

In the drawings:

Fig. 1 is a side view of a fish lure in accordance with the invention;

Fig. 2 is a top view thereof;

Fig. 3 is a front end view of the front body member; and

Fig. 4 is a fragmentary view, on an enlarged scale, with the body members being longitudinally sectioned.

In the embodiment of the invention shown in the drawings, there are first and second body members 5 and 6, respectively. It is preferred that these members be of clear and colorless stock in order that the advantages of the invention be realized to the fullest extent. For this purpose, acrylic resins in rod form have proved satisfactory as such plastics, in addition to being clear and colorless, are low in moisture absorption, resistant to shattering, and rank high in light transmitting properties. The body members may, of course, be molded.

Such stock enables cylindrical bodies to be formed simply by cutting the plastic rods into suitable lengths and, in practice, the cuts establish the front end of the member 5 as a beveled face 7 to be disposed forwardly and downwardly in the completed lure. The shank 8 of the line receiving eye 9 is threaded into the face 7, usually in the upper part thereof.

The second member 6 has its front end in the form of a beveled face 10 to be disposed in the finished lure, at right angles to the face 7. As, in practice, the face 10 is formed when the members 5 and 6 are separated from one another or from corresponding members, the rear of the member 5 is also a beveled face 11 disposed at right angles to the front face 7.

The members 5 and 6 are pivotally united in end-to-end relation by inter-engaged eyes 12 and 13 whose shanks 14 and 15, respectively, are threaded into the proximate faces of the body members. It will be noted that not only are the members 5 and 6 pivotally interconnected in end-to-end relation but also that the shanks 14 and 15 are so located that they effect a laterally offset and overlapping relation between the body members, as will be apparent from Fig. 2.

A shank 16 is threaded into the rear face of the body member 6 and its eye 17 holds the eye 18 of the generally indicated hook unit 19.

While it will be appreciated that the beveled faces 7 and 10 coupled with the offset relationship of the body members cause those members to swing relative to each other to simulate the motion of a swimming fish, this action is particularly effective when the lure is twitched as it moved through the water.

It will be noted that the shanks 8, 14, 15, and 16 extend a substantial distance into the respective ends of the members. When the bodies are of translucent stock, the shanks are visible to suggest, for example, the backbone of a minnow or a body stripe. For that reason, the shanks may be given a coat of any desired color and this color, being internal, is well protected.

Where the plastic is clear and colorless, as is preferred, additional advantages are present since natural colorations of the waters being fished are picked up and the lure responds to existing light conditions with a radiance or luminous effect sometimes being present.

From the foregoing, it will be apparent that lures in accordance with the invention meet the general objective in that it makes possible the combination of an effective minnow-like motion with a definite, but minimum, visible dimensional limitations.

What I therefore claim and desire to secure by Letters Patent is:

1. In a fish lure, first and second body members of approximately the same cross sectional size and shape and pivotally interconnected in end-to-end but offset and overlapping relationship, the leading end of each member including a bevelled face disposed approximately in a plane at right angles to the plane of the other member when the axes of the two members are parallel.

2. In a fish lure, first and second cylindrical body members, both of approximately the same diameter, means pivotally interconnecting said members in an end-to-end but offset and overlapping relationship, the leading end of each member being bevelled and disposed in a plane approximately at right angles to the plane of the other member when the axes of the two members are parallel.

3. In a fish lure, first and second cylindrical body members both of approximately the same diameter, means pivotally interconnecting said members in an end-to-end but offset and overlapping relationship, the leading end of the first member being forwardly and downwardly bevelled and the front of the second member being bevelled and disposed in a plane approximately at right angles to the plane of the leading end of the first member.

4. In a fish lure, first and second cylindrical body members of a translucent plastic, both of approximately the same diameter, means pivotally interconnecting said members in an end-to-end but offset relationship, said means including anchor portions, one for each member, and disposed eccentrically therein in the proximate faces of the members, a line attaching element including an anchor portion disposed in the front face of the first member, and a hook including an anchor portion disposed in the rear face of the second member, each of said anchor portions being colored and visible, the front end of each member being bevelled and disposed in a plane approximately at right angles to the plane of the bevelled end of the other member.

5. The fish lure of claim 4 in which the plastic stock is clear.

References Cited in the file of this patent

UNITED STATES PATENTS

| | | |
|---|---|---|
| 1,545,683 | Nowark | July 14, 1925 |
| 1,582,713 | Welch | Apr. 27, 1926 |
| 1,585,943 | Streich | May 25, 1926 |
| 1,997,802 | Meyer | Apr. 16, 1935 |
| 2,503,529 | Wardrip | Apr. 11, 1950 |
| 2,517,620 | Anderson | Aug. 8, 1950 |
| 2,538,171 | Stroup et al. | Jan. 16, 1951 |
| 2,606,388 | Croft et al. | Aug. 12, 1952 |
| 2,733,535 | Rosen | Feb. 7, 1956 |
| 2,789,385 | Seeger | Apr. 23, 1957 |

FOREIGN PATENTS

| | | |
|---|---|---|
| 486,258 | Canada | Sept. 9, 1952 |